US012710386B2

(12) United States Patent
Kirmizakis et al.

(10) Patent No.: US 12,710,386 B2
(45) Date of Patent: Aug. 18, 2026

(54) METHODS OF IDENTIFYING TYPES OF IRON SCALE

(71) Applicants: Saudi Arabian Oil Company, Dhahran (SA); King Fahd University of Petroleum & Minerals, Dhahran (SA)

(72) Inventors: Panagiotis Kirmizakis, Dhahran (SA); Norah Abdullah Aljeaban, Al Khobar (SA); Tao Chen, Dhahran (SA); Pantelis Soupios, Dhahran (SA); Ammar El-Husseiny, Dhahran (SA); Mohamed Mahmoud, Dhahran (SA)

(73) Assignees: King Fahd University of Petroleum & Minerals, Dhahran (SA); Saudi Arabian Oil Company, Dhahran (SA)

( * ) Notice: Subject to any disclaimer, the term of this patent is extended or adjusted under 35 U.S.C. 154(b) by 202 days.

(21) Appl. No.: 18/467,489

(22) Filed: Sep. 14, 2023

(65) Prior Publication Data

US 2025/0076239 A1 Mar. 6, 2025

(30) Foreign Application Priority Data

Aug. 30, 2023 (GR) .............................. 20230100702

(51) Int. Cl.
*G01N 27/20* (2006.01)
*G01N 27/04* (2006.01)

(52) U.S. Cl.
CPC ........... *G01N 27/20* (2013.01); *G01N 27/041* (2013.01)

(58) Field of Classification Search
CPC ............................ G01N 27/20; G01N 27/041
See application file for complete search history.

(56) References Cited

U.S. PATENT DOCUMENTS

| | | | | |
|---|---|---|---|---|
| 10,816,494 | B2 | 10/2020 | Cerpi et al. | |
| 2014/0002088 | A1* | 1/2014 | Hudson | E21B 47/047 324/324 |
| 2014/0218037 | A1 | 8/2014 | Slater et al. | |
| 2014/0297186 | A1* | 10/2014 | Suarez-Rivera | E21B 49/00 702/27 |
| 2019/0129056 | A1* | 5/2019 | Rasmus | G01V 3/30 |
| 2021/0239872 | A1* | 8/2021 | Wheelock | G01N 27/043 |

OTHER PUBLICATIONS

Feng et al., "Quantifying Induced Polarization of Conductive Inclusions in Porous Media and Implications for Geophysical Measurements," Scientific Reports, 2020, 10(1669):1-12.

Ntarlagiannis et al., "Low-frequency electrical response to microbial induced sulfide precipitation," Journal of Geophysical Research: Biogeosciences, Nov. 19, 2005, 110(G2):1-12.

Personna et al., "Spectral induced polarization and electrodic potential monitoring of microbially mediated iron sulfide transformations," Journal of Geophysical Research, May 2008, 15 pages.

Placencia-Gomez et al., "Laboratory SIP signatures associated with oxidation of disseminated metal sulfides," J. Contam. Hydrol., May 2013, 148:25-38.

Slater et al., "Pore-scale spectral induced polarization signatures associated with FeS biomineral transformations," Geophysical Research Letters, 2007, 34(L21404):1-5.

* cited by examiner

*Primary Examiner* — Feba Pothen
(74) *Attorney, Agent, or Firm* — Fish & Richardson P.C.

(57) ABSTRACT

This disclosure relates to methods for identifying an onset of a scale formation. This disclosure also relates to methods of identifying a scale type in a hydrocarbon containing formation. This disclosure also relates to determining an amount of a scale formation in a hydrocarbon containing formation.

17 Claims, 7 Drawing Sheets

METHODS OF IDENTIFYING TYPES OF IRON SCALE

TECHNICAL FIELD

This document relates to methods for identifying a scale type in-situ in a hydrocarbon containing formation. This document also relates to identifying an onset of scale formations in a hydrocarbon containing formation. This document also relates to identifying an amount of a scale formation in a hydrocarbon containing formation.

BACKGROUND

Scaling in oil processing systems is the precipitation and buildup of solids (insoluble crystals) typically resulting from a mixture of incompatible aqueous phases. Scale is a term used in the oil industry to describe solid deposits that accumulate over time and obstruct and impair the flow of formation fluids through hydrocarbon extraction equipment (e.g., pipelines, valves, pumps). The obstructions can lead to clogging and a sizable drop in production rates and even result in equipment damage. Scaling poses a significant obstacle for assuring fluid flow in the hydrocarbon production industry. Common oil field scales include iron sulfides, barium sulfate, strontium sulfate, and calcium carbonate.

Iron scale, for example, can be formed in the reservoir rocks and well tubulars due to corrosion in metal pipes. Iron scale can be formed in the reservoir rocks and well tubulars due to the interaction between iron and hydrogen sulfide ($H_2S$) in sour formations. Iron scale can be formed in the reservoir rocks and well tubulars due to the presence of sulfate-reducing bacteria (SRB) in the formation. Iron sulfide scale can exist in several different forms ranging from a heavy liquid to fine particles that deposit on hydrocarbon formations and/or hydrocarbon production equipment. Iron sulfide scale can impact well productivity greatly. In some instances, hydrocarbon production of formation fluids declines to almost zero due to the complete obstruction of the hydrocarbon reservoir pore space in the vicinity of the wellbore. Therefore, it would be beneficial to identify the onset of, or detect at early stages, scale formation to take any necessary action to prevent more nucleation and further scale formation. Currently, there are no reliable field and/or logging techniques to identify the scale type and the onset of scale formation in the reservoir rocks or well tubular. While direct sampling can provide estimates of the scale present, this approach is spatially limited, invasive, expensive, and time-consuming. One must take note of the limitations of direct measurements, which cannot determine a quantitative amount of the scale formation. Direct measurements provide only spatially and temporally limited windows into the extent of a scale problem leading to generally underestimating scaling problems. Signs of scale formation buildup such as flow rate reduction, pressure decline, screen, and perforations blockage, usually appear during the late stages of scale formation when remedial action is too late to be implemented and/or is not of significant value. In many instances, the problems arising from scale formation end with the need to replace the tubing and/or fracture the reservoirs to remove the scaling damage.

Therefore, there is a need for a method to identify the onset of, or detect at early stages, scale formation to take any necessary action to prevent more nucleation and further scale formation in hydrocarbon formations.

SUMMARY

Provided in the present disclosure is a method for identifying an onset of a scale formation, the method including:

applying an alternating current to a sample from a hydrocarbon containing formation: varying the frequency of the alternating current to the sample: measuring a phase shift and conductivity magnitude of the applied alternating current; and identifying an onset of a scale in the sample based on the phase shift and conductivity magnitude.

Also provided in the present disclosure is a method for identifying scale type, the method including: applying an alternating current to a sample comprising scale from a hydrocarbon containing formation: varying the frequency of the alternating current to the sample: measuring a phase shift and conductivity magnitude of the applied alternating current; and identifying a scale type of the sample based on the phase shift and conductivity magnitude. In some embodiments of the method, the method further includes determining the amount of a scale formation in the hydrocarbon containing formation.

In some embodiments of the methods, the hydrocarbon containing formation comprises production tubing.

In some embodiments of the methods, the hydrocarbon containing formation comprises reservoir rock formations.

In some embodiments of the methods, the scale type comprises one or more iron sulfides.

In some embodiments of the methods, the scale type comprises iron (II) disulfide (pyrite).

In some embodiments of the method, the frequency of the alternating current is varied within a frequency range of about 0.01 to about 10,000 Hz.

In some embodiments of the methods, the method further includes differentiating a portion of a signal resulting from the applied alternating current, wherein the portion of the signal results from the production tubing.

In some embodiments of the methods, the method further includes determining a real component of a complex conductivity using the phase shift and conductivity magnitude, where the real component comprises energy loss.

In some embodiments of the methods, the method further includes determining an imaginary component of a complex conductivity using the phase shift and conductivity magnitude, where the imaginary component comprises an out-of-phase energy storage.

In some embodiments of the methods, the method further includes identifying at least one grain property of the scale, where the grain property comprises at least one of the following: size, geometry, distribution, and roughness.

In some embodiments of the methods, the method further includes identifying a structure of the scale.

In some embodiments of the methods, the method further includes identifying a composition of the scale.

In some embodiments of the methods, the method further includes measuring potentials with an Ag—AgCl potential electrode.

In some embodiments of the methods, the method further includes the alternating current is applied using an Ag—AgCl electrode.

In some embodiments of the methods, the sample is saturated with a low salinity solution.

Also provided in the present disclosure is a system for identifying scale type, the system including: an electrode configured to apply an alternating current to a sample comprising scale from a hydrocarbon containing formation; a control configured to vary the frequency of the alternating current to the sample; and a potential electrode for measuring a phase shift and conductivity magnitude of the applied alternating current for identifying a scale type from the sample.

DETAILED DESCRIPTION

Figure 1:
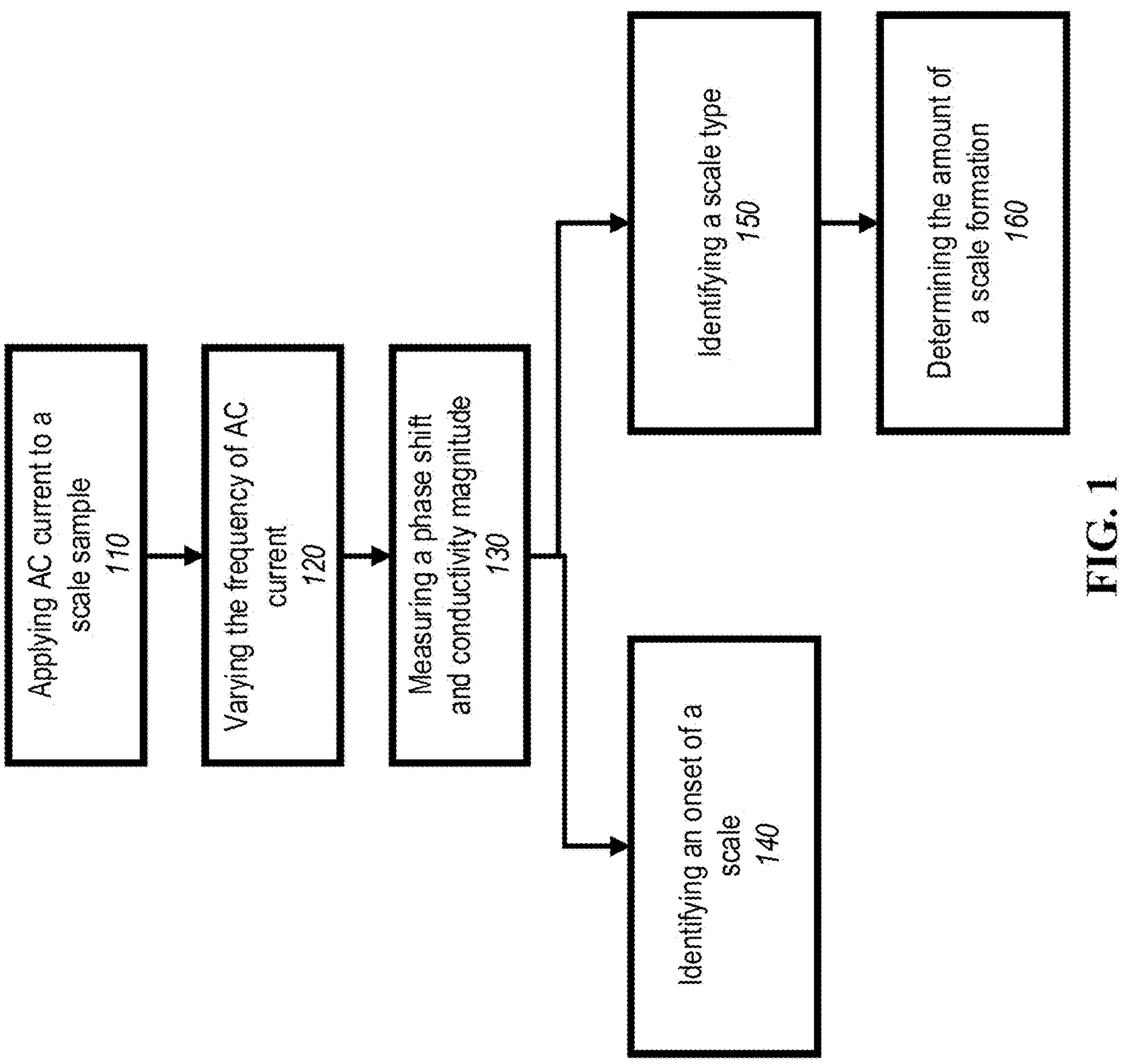
FIG. 1 illustrates a schematic representation of an embodiment of a method of analyzing a scale sample.
Figure 2:
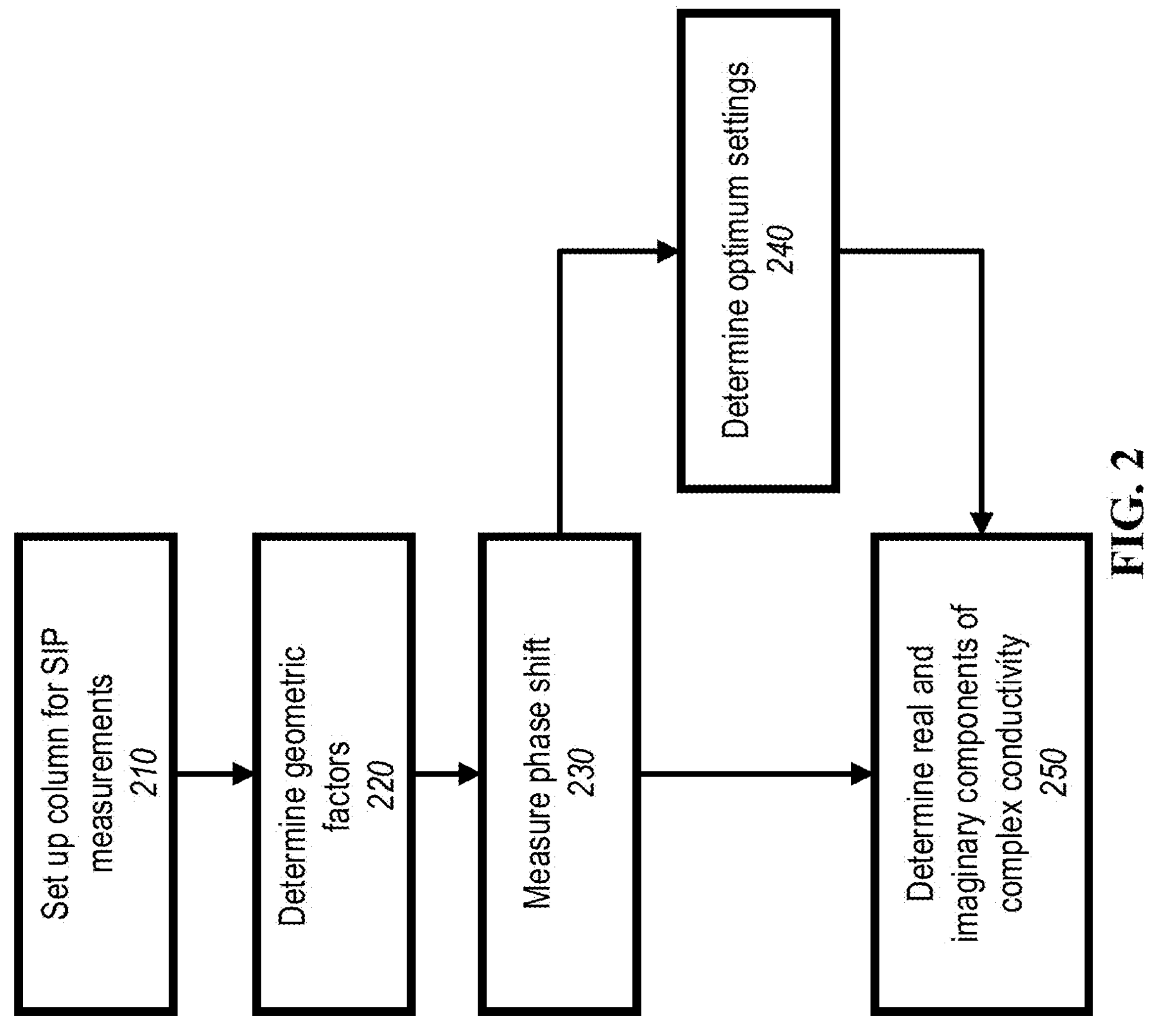
FIG. 2 illustrates a schematic representation of an embodiment of a method of defining real and imaginary components of complex conductivity.

There is a need for a method to identify the onset of, or detect at early stages, scale formation to take any necessary action to prevent more nucleation and further scale formation in hydrocarbon formations. Herein is introduced use of geophysical technology in an application for identifying different deposited scale in production tubing and differentiating the scale based on chemical/mineral composition. In some embodiments, a method for identifying an onset of a scale formation includes (as illustrated in FIG. 1): applying an alternating current (110) to a sample from a hydrocarbon containing formation: varying the frequency of the alternating current (120) to the sample: measuring a phase shift and conductivity magnitude (130) of the applied alternating current; and identifying an onset of a scale in the sample (140) based on the phase shift and conductivity magnitude. In some embodiments, the method includes identifying a scale type (150) of the sample based on the phase shift and conductivity magnitude. In some embodiments, the method includes determining the amount or volume of a scale formation (160) in at least a portion of the hydrocarbon containing formation and/or associated production equipment. FIG. 2 illustrates a schematic representation of an embodiment of a method for analyzing a scale sample. A method can include setting up a column or chamber for SIP measurements (210). The method may include determining a geometric factor (220) using conductivity and specific conductance of fluid solutions with a known conductivity followed by measuring the phase shift (230). The method includes, in some embodiments, determining (240) the optimum settings (e.g., frequency, range, number of steps). The method may include determining (250) real components and imaginary components of complex conductivity.

In some embodiments, spectral induced polarization (SIP) is used to identify the onset and/or type of scale. SIP is a geophysical survey technique and an extension of the induced polarization (IP) method. SIP measures the frequency-dependent complex impedance, equivalent to the amount of resistance and phase shift between electric current and voltage. SIP aims to distinguish material properties of the subsurface.

In some embodiments, methods described herein use a geophysical method for identifying different iron scales of production tubing and differentiate between major composition ranges. SIP, in general, can be used to reduce ambiguity in the interpretation of the subsurface compared to conventional resistivity surveys. SIP can provide a number of advantages compared to conventional methods. Advantages of SIP include low-cost method of conducting high-performance multi-frequency measurements. SIP advantages include that the method is non-destructive for the material being tested. SIP methods described herein can monitor changes within a sample by collecting time lapse measurements. In some embodiments, methods described herein provide indirect estimations of effective porosity, surface area, grain/pore distribution, as well as other properties. In some embodiments, SIP devices are adjusted based upon the needs of a given hydrocarbon containing formation (e.g., chamber size, number of electrodes, physical phase of a sample).

In some embodiments, a sample from the hydrocarbon containing formation is from production tubing. Production tubing can include equipment commonly associated with the production of fluids, typically hydrocarbon fluids from hydrocarbon containing formations. In some embodiments, a sample from the hydrocarbon containing formation is from reservoir rock formations within the hydrocarbon formation. Reliable determination of the presence and type of scale is of paramount importance for multiple aspects of hydrocarbon exploration and production. In some embodiments, an SIP device is used to characterize surface scale (e.g., calcite) from production tubing and/or formations within hydrocarbon formations using SIP methods described herein. In some embodiments, the scale type includes one or more inorganic salts. In some embodiments, the scale type includes iron sulfides, barium sulfate, strontium sulfate, or calcium carbonate. In some embodiments, the scale type includes one or more iron sulfides. In some embodiments, the scale type includes iron (II) disulfide (pyrite). Experiments described herein demonstrate that SIP is a sensitive identification tool for characterizing different scales. In some embodiments, the SIP measurement methods result in an early in-situ identification of scale type in hydrocarbon producing formations.

In some embodiments, the samples are real sulfide scales formed under field conditions in hydrogen wells or hydrocarbon production facilities. In some embodiments, the samples are characterized by complex and heterogeneous structures as described by their elemental composition that are described herein. Scales can contain multiple iron sulfide phases and mineralogical impurities, leading to variations in phase distribution, elemental composition, and morphology. This complexity affects the resulting SIP measurements. Methods described herein are able to identify types of scales from such complex samples.

In some embodiment, a sample is prepared for measurement by grinding to a particular size and/or homogeneous particle size. Samples may be ground and sieved to a particle size between about 425 to about 600 μm. Samples may physically altered (e.g., ground and/sieved) to have a homogeneous phase and remove any side effects of grain heterogeneity. In some embodiments of the methods, the sample is saturated with a low salinity solution.

Samples may be tested in a column or chamber (e.g., formed from acrylic material). The chamber may be fitted with current and potential electrodes for conducting the spectral induced polarization measurements. The current and potential electrodes may include Ag—AgCl electrodes.

In some embodiments, the method includes measuring potentials with a Ag—AgCl potential electrode. In some embodiments, the method includes applying the alternating current using a Ag—AgCl electrode. Columns can be adjusted (e.g., column size, number of electrodes, physical phase of sample) based on the needs of the formation being tested.

In some embodiments, the method uses SIP to apply an alternating current to a sample comprising scale from a hydrocarbon containing formation. The frequency of the alternating current applied can vary within a frequency range of about 0.01 to about 10,000 Hz. In some embodiments, SIP measurements are obtained in a frequency range of about 10 to about 10,000 Hz; about 100 to about 10,000 Hz: about 10 to about 1,000 Hz: or about 100 to about 1,000 Hz. SIP measurements can be collected using, but not limited to, about seven measurements per logarithmic decade. In some embodiments, a base configuration acquires measurements across a frequency range of about 0.01 Hz to about 20 KHz. A base configuration may acquire measurements across a frequency range of about 1 Hz to about 20 kHz; about 0.01 Hz to about 10 KHz; or about 0.01 Hz to about 100 KHz.

Figure 3:
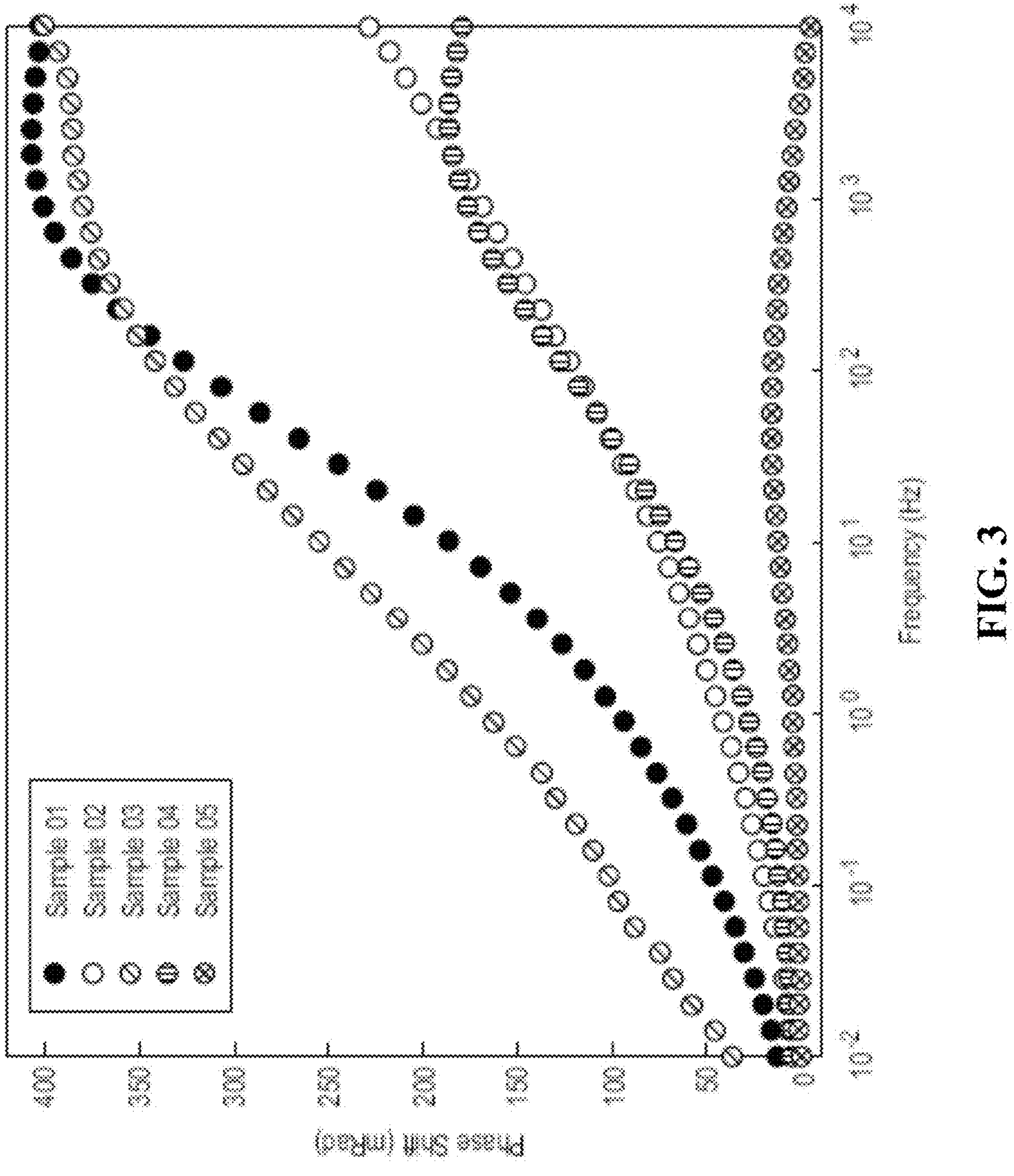
FIG. 3 illustrates a phase shift data for the scale amended columns over a wide frequency range (0.01-10,000 Hz).

In some embodiments, the method includes measuring a phase shift and conductivity magnitude of the applied alternating current. Phase can be considered as a measure of polarizability relative to ohmic conduction. While both phase and imaginary conductivity show few similar trends (not in magnitude), phase highlights the observed trends more clearly. Phase results from examples described herein clearly distinguish between the samples. The calcite scale appears with lower values. FIG. 3 illustrates a phase shift data for the scale amended columns over a wide frequency range (0.01-10,000 Hz). The SIP methods described herein measure the phase shift (φ) and conductivity magnitude (|σ|) of an injected alternating current. In some embodiments, the measurements are acquired across a wide frequency range as discussed previously. In some embodiments, the SIP methods measure the phase shift (φ) and conductivity magnitude (|σ|) of an injected alternating current. In some embodiments, the method further includes determining a real component of a complex conductivity using the phase shift and conductivity magnitude. The real component can include energy loss. In some embodiments, the method further includes determining an imaginary component of a complex conductivity using the phase shift and conductivity magnitude. The imaginary component can include an out-of-phase energy storage. In some embodiments, the phase shift (φ) and conductivity magnitude (|σ|) of an injected alternating current are used to estimate the real (σ') and imaginary (σ") component of complex conductivity (σ*) or complex resistivity $$\left(p^* = \frac{1}{c^*}\right).$$

The resistance amplitude can be determined from the magnitude times the value of the selected shunt resistor. A Portable Spectral Induced Polarization Unit (PSIP) offers the possibility to choose the most appropriate value (e.g., 10 Ω, 100 Ω, 1000Ω, and 10000Ω) depending on the resistance of the sample. For SIP low-frequency complex conductivity (σ*), equation 1 illustrates how complex conductivity is determined.

$$\sigma^* = \sigma' + i\sigma'' \tag{1}$$

Equations 2 and 3, illustrate how complex conductivity's real (σ') and imaginary (σ") components are determined.

$$\sigma' = |\sigma| \cos \varphi \tag{2}$$

$$\sigma'' = |\sigma| \sin \varphi \tag{3}$$

The real part (σ') of the complex conductivity describes energy loss (in-phase conduction). The imaginary component (σ") describes polarization or out-of-phase energy storage.

Figures 4A, 4B:
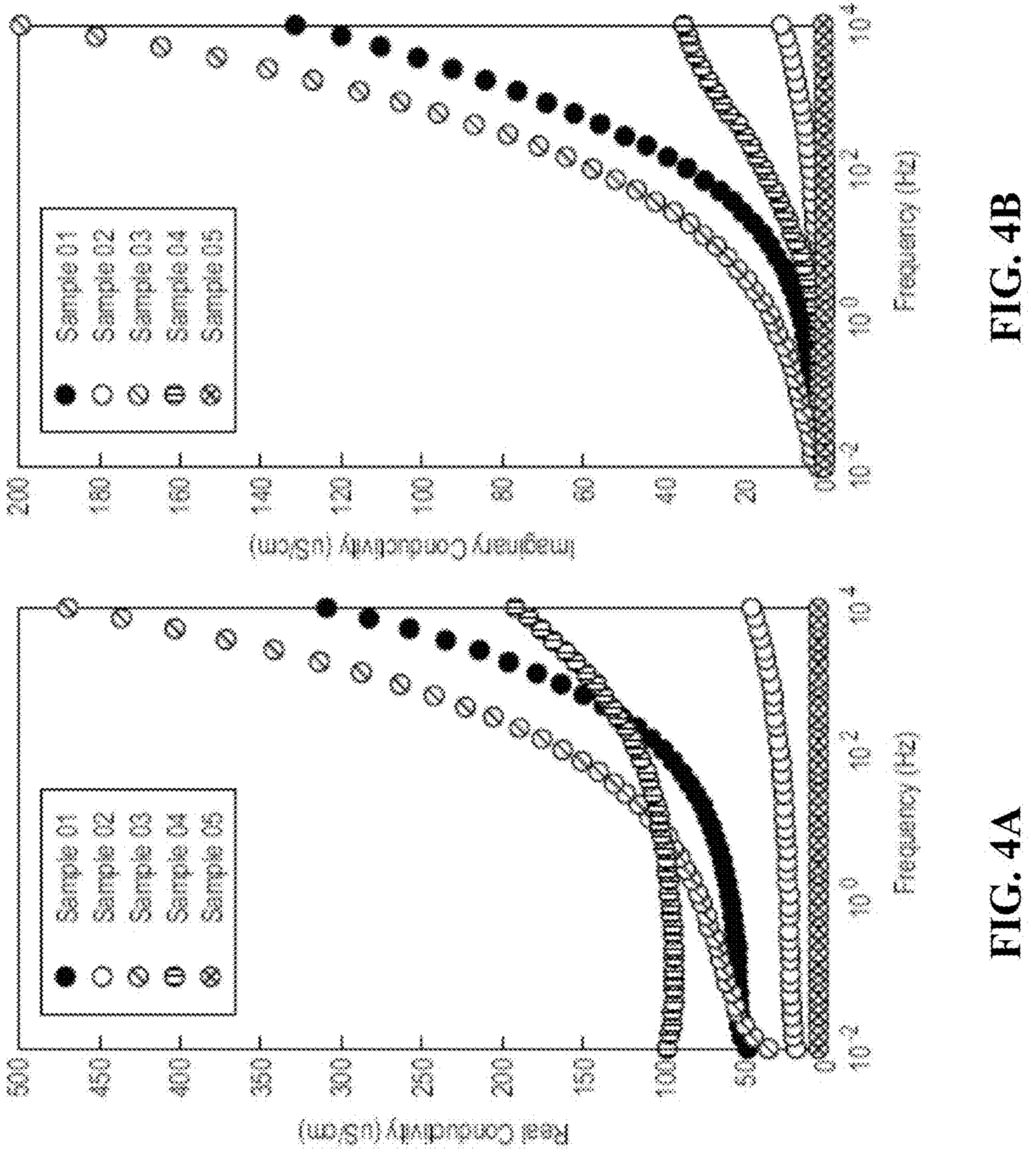
FIGS. 4A-4B illustrates spectral induced polarization data for the scale amended columns over a wide frequency range (0.01-10,000 Hz) including real conductivity (A4A) data and imaginary conductivity data (A4B).

As demonstrated by the example samples, a real conductivity shows an increase in the 10 to 10,000 Hz region, as illustrated in FIG. 4A. The increase in real conductivity is related to an increase in conductivity with increasing pyrite/metallic content. In the example samples, below 10 Hz the real conductivity shows no dependence on frequency. An imaginary conductivity shows a similar increase in the 10 to 10,000 Hz region, as illustrated in FIG. 4B.

Figure 5:
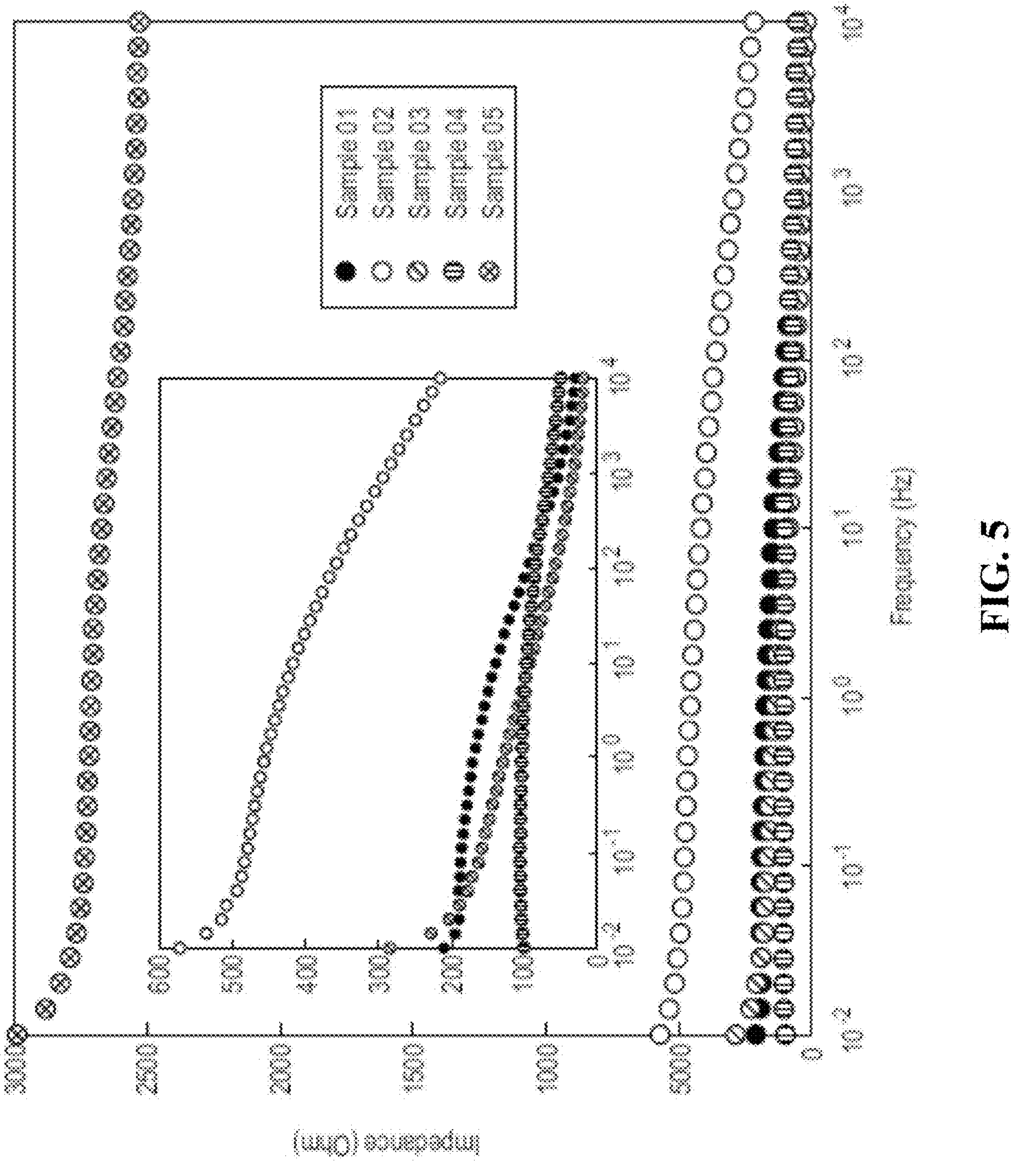
FIG. 5 illustrates impedance data for the scale amended columns over a wide frequency range (0.01-10,000 Hz). The inset figure highlights the impedance difference between samples 1 to 4 that is otherwise not visible due to scale differences.

Methods described herein can determine the impedance using SIP measurements. Impedance is the opposition of the system to an alternating current. With direct current (DC) impedance and resistance are the same, while alternating current (AC) is frequency dependent. Moreover, the difference between the impedance values of different scale types appears to be mostly constant through the frequency range which resulted in almost parallel curves (see FIG. 5). FIG. 5 illustrates impedance data for the scale amended columns over a wide frequency range (0.01-10,000 Hz). The inset figure in FIG. 5 highlights the impedance difference between samples 1 to 4 that is otherwise not visible due to scale differences. Thus one can see that in some embodiments, impendence measurements resulting from the methods described herein can differentiate between different scale types.

The examples illustrate a high sensitivity of the SIP method to different types of scale: even when there are only minor composition differences. The types of scales which can be differentiated is not limited to the types of scale tested herein. Identifying an existence of a scale problem and identifying the problem as soon as possible is essential for treatment and removal of the scale from a hydrocarbon containing formation and/or associated production equipment.

SIP provides additional sensitivity to the surface properties of certain materials, specifically metallic targets. In some embodiments, SIP can provide rapid and spatially extensive information on a scale's grain properties. In some embodiments of the methods, the method further includes identifying at least one grain property of the scale. In some embodiments, the Cole-Cole fitting is a data analysis technique used to interpret the SIP response of a material as a function of frequency. It is important to note that other models, such as the Debye model or the Warburg model, may be used depending on the specific properties of the material under investigation. By fitting the measured data to the aforementioned technique, one can extract the parameters $\sigma_\infty$ (conductivity at infinite frequency representing the conductivity of the materials' electrolyte—fully polarized state), $\sigma_0$ (DC conductivity representing the background conductivity—fully resistive state), τ (relaxation time representing the characteristic time scale of the polarization process) and c (Cole-Cole parameter, which determines the shape and width of the Cole-Cole curve). The difference between $\sigma_\infty$ and $\sigma_0$ can be used to provide insights into the material's bulk and surface conductivity, respectively. The relaxation time (which is the reciprocal of the peak frequency of SIP signal) is related to the time required for the polarization process to occur and is related to the size and distribution of polarizable particles or grains within the material. The Cole-Cole parameter influences the width of the Cole-Cole curve. The Cole-Cole parameter characterizes the heterogeneity or complexity of the polarization process. For instance, if c approaches 1, the polarization behaviour is more dispersive, while values less than 1 indicate more complex relaxation.

In some embodiments, grain properties include size, geometry, distribution, and roughness. In some embodiments, SIP provides information on a scale's composition. In some embodiments, SIP provides information on a scale's structure. Different relaxation times or spectral shapes may be used to determine different microstructural components or layers with distinct electrical properties. In the case of scale (e.g., iron particles), the volume of the target (scale) affects the magnitude of the response, while the grain size the peak frequency. The same behavior, frequency dependence with grain size, is also observed in earth samples without metallic particles. While this relationship is not disputed, the current discussion on the signal source for SIP: is the grain size, the pore size, or a combination of the two.

In some embodiments, a structure of a material is determined to be crystalline or amorphous. In some embodiments, SIP provides information on a scale's mass and/or volume (e.g., within a portion of a hydrocarbon containing formation and/or production tubing). In some embodiments, the concentration of scale directly influences the magnitude of the SIP parameters, including the phase and imaginary conductivity. At high scale concentrations, the scale is more likely to form a more continuous phase, and thus the SIP signal is more dominated by the scale particles, and any contribution from the nonmetallic media (hosting formation) is negligible. In contrast, in the low scale mass and/or volume, this contribution is significant enough to affect the response peak frequency. While SIP does not directly measure mass or volume, it can help to quantify the scale's mass and/or volume indirectly.

In some embodiments, SIP methods described herein provide information on a scale's distribution. In some embodiments of the methods, the method further includes identifying a composition of the scale. In some embodiments, SIP is used for the detection of organic and inorganic contaminants, soil improvement through microbial-induced calcite precipitation, contamination detection, and bioremediation monitoring.

SIP measurements for scale identification are somewhat more complicated due to the presence of metal (e.g., steel) casing or production tubing. In some embodiments, the method further includes differentiating a portion of a signal resulting from the applied alternating current, wherein the portion of the signal results from the production tubing. Methods described herein can be used to remove the casing effect. In some embodiments, the casing effect is calculated and removed by taking measurements in casing with deposited scale and without and differentiate the signal. An average of a casing effect can be subtracted from a measurement in some instances. An average casing effect for different casing materials can be used to adjust field measurements based on the specific field casing when it is not possible to take measurements of a casing without scale.

The methods described herein can be used with wells other than hydrocarbon producing wells. Other pipelines to which the herein described methods could be applied include, for example, water injection wells, water disposal wells, water production wells, as well as various surface pipelines.

In some embodiments, the methods described herein use spectral induced polarization (SIP) to determine the deposited scale type in a hydrocarbon containing formation and/or associated production equipment. Examples herein demonstrate SIP signals (e.g., phase shift, imaginary conductivity, and real conductivity) are highly sensitive to different scale types. Specifically SIP measurements illustrate there is a high dependency on, for example, pyrite concentration within the scale. The examples illustrate real conductivity increases with frequency starting at 10 Hz and reaching the upper test limit. The embodiments herein illustrate the ability of SIP to function as a robust and reliable method to identify different scale types in hydrocarbon containing formations and/or associated production equipment.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting: information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

"Alternating current (AC)", as used herein, refers to a time-varying current that reverses direction substantially sinusoidally.

"Clogging", as used herein, refers to impeding and/or inhibiting flow of one or more compositions through a process vessel or a conduit.

"Formation" or "hydrocarbon containing formation", as used herein, refers to one or more hydrocarbon containing layers, one or more non-hydrocarbon layers, an overburden, and/or an underburden. "Hydrocarbon layers" refer to layers in the formation that contain hydrocarbons. The hydrocarbon layers may contain non-hydrocarbon material and hydrocarbon material. The "overburden" and/or the "underburden" include one or more different types of impermeable materials. For example, the overburden and/or underburden may include rock, shale, mudstone, or wet/tight carbonate.

"Formation fluids", as used herein, refer to fluids present in a formation and may include in situ processed hydrocarbon fluid, naturally occurring hydrocarbon fluid, gas, and water. Formation fluids may include hydrocarbon fluids as well as non-hydrocarbon fluids.

"Hydrocarbons", as used herein, are generally defined as molecules formed primarily by carbon and hydrogen atoms. Hydrocarbons may also include one or more other elements such as halogens, sulfur, nitrogen, oxygen, and/or metallic elements. Hydrocarbons may include one or more of kerogen, bitumen, pyrobitumen, oils, natural mineral waxes, and asphaltites. "Hydrocarbon fluids" are fluids that include hydrocarbons.

"Production tubing", as used herein, is generally defined as equipment associated with the preparation and/or production of hydrocarbons.

"Scale", as used herein, refers to accumulation of different materials that can lead to clogging and prevent fluid flow in the wellbore, production tubing, valve, casing, perforations and downhole equipment. Examples of scale include salts such as inorganic salts (e.g., $CaCO_3$, $BaSO_4$, and $SrSO_4$) or different iron sulfides such a pyrite $FeS_2$.

"Wellbore", as used herein, refers to a hole in a formation made by drilling or insertion of a conduit into the formation. A wellbore may have any cross-sectional shape. As used herein, the terms "well" and "opening," when referring to an opening in the formation may be used interchangeably with the term "wellbore".

Examples

Samples were obtained from Saudi Aramco. Samples obtained were influenced by various environmental factors, such as temperature, pressure, fluid composition, and flow dynamics. These factors impact the growth rate, crystallinity, and chemical composition of real scales, which in turn affect their SIP responses. Real scale SIP measurements capture the specific conditions under which scales formed.

Figures 6, 7:
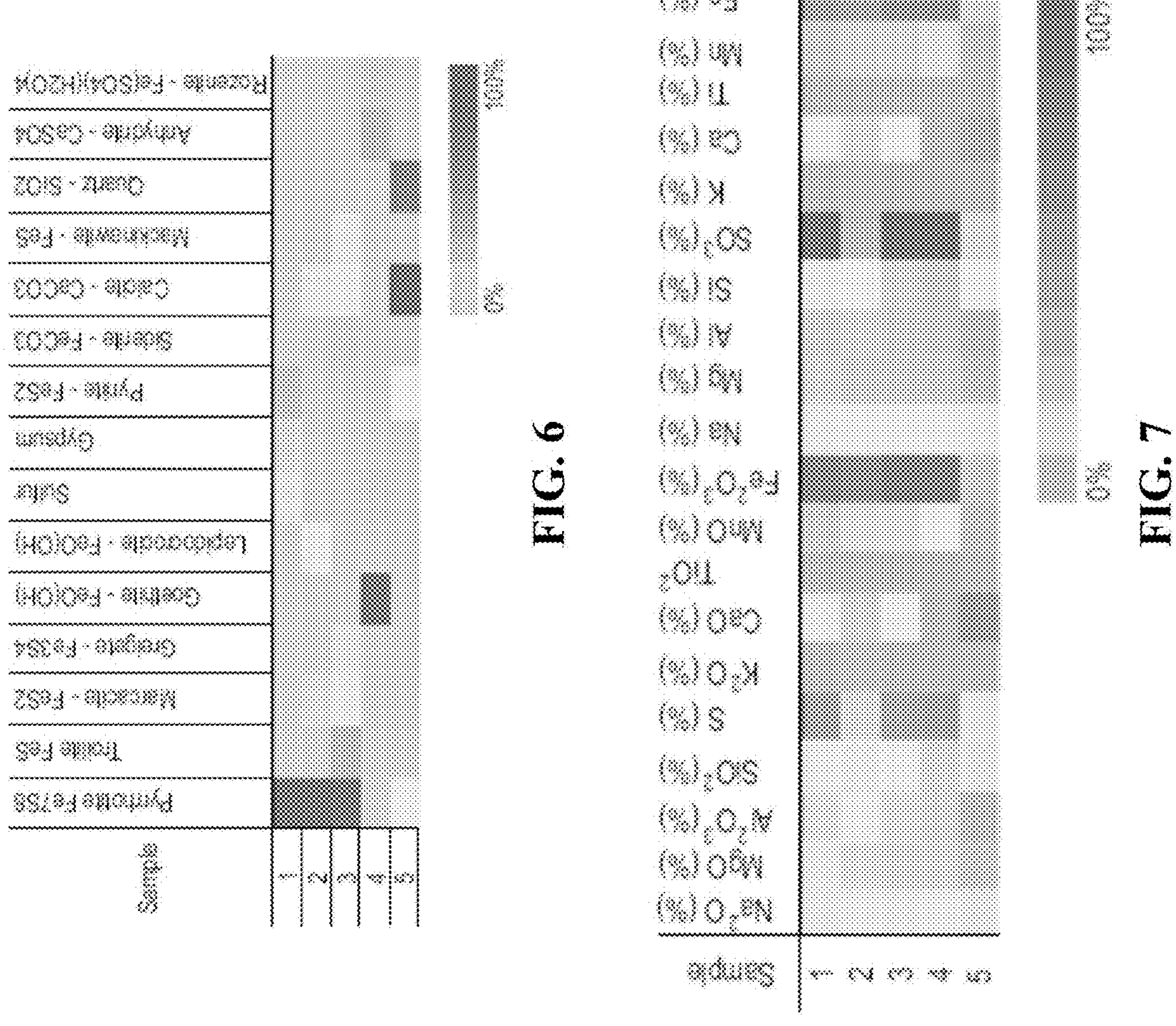
FIG. 6 illustrates a heatmap of mineral concentration for tested samples in % from X-Ray Diffraction (XRD) analysis.
FIG. 7 illustrates a heatmap of elemental composition of tested samples in % from X-Ray Fluorescence (XRF) analysis.

Different samples were ground and sieved to a particle size between 425 and 600 μm and tested in laboratory-scale SIP columns (190 mm length and 23 mm internal diameter). The samples were ground and sieved in order to have a homogeneous phase and remove any side effects of grain heterogeneity. FIG. 6 illustrates a heatmap of mineral concentration for tested samples in % from X-Ray Diffraction (XRD) analysis. FIG. 7 illustrates a heatmap of elemental composition of tested samples in % from X-Ray Fluorescence (XRF) analysis. The mineral composition of the scales is shown in Table C1. The samples were composed mostly of iron sulfides such as pyrrhotite, troilite, and pyrite, and iron oxides such as goethite and lepidocrocite, while one surface calcite scale was also present. In addition, two buffer layers of Ottawa sand at the top and bottom parts of all columns have been added to ensure homogeneous current flow in the target area. The final experimental setup features a 4 cm of scale layer (target area) and a top/bottom Ottawa sand layer (buffer layers), allowing parallel SIP measurements at short (focusing only on the scale layer) and wide (extending beyond the scale layer into the sand layer) scale. The Ottawa sand (150-600 μm) was obtained from Fisher Scientific (https://www.fishersci.com) and used without any modifications.

TABLE C1

Mineral concentration of tested samples in % from X-Ray Diffraction (XRD) analysis.

| ID. | Mineral | Concentration (%) |
|---|---|---|
| Sample 01 | Pyrrhotite ($Fe_7S_8$) | 76.1 |
| | Sulfur | 2.7 |
| | Gypsum | 6.6 |
| | Pyrite ($FeS_2$) | 14.6 |
| Sample 02 | Pyrrhotite ($Fe_7S_8$) | 70.9 |
| | Marcacite ($FeS_2$) | 5.2 |
| | Lepidocrocite (FeO(OH)) | 1 |
| | Pyrite ($FeS_2$) | 8.5 |
| | Calcite ($CaCO_3$) | 2 |
| Sample 03 | Pyrrhotite ($Fe_7S_8$) | 63.4 |
| | Troilite (FeS) | 18.5 |
| | Marcacite ($FeS_2$) | 1.1 |
| | Greigete ($Fe_3S_4$) | 4.4 |
| | Siderite ($FeCO_3$) | 9.5 |
| | Calcite ($CaCO_3$) | 1 |
| | Mackinawite (FeS) | 2.1 |
| Sample 04 | Goethite (FeO(OH)) | 60.6 |
| | Sulfur | 9.4 |
| | Anhydrite ($CaSO_4$) | 18 |
| | Rozenite ($Fe(SO_4)(H_2O)_4$) | 12 |
| Sample 05 | Pyrrhotite ($Fe_7S_8$) | 0.2 |
| | Pyrite ($FeS_2$) | 0.1 |
| | Calcite ($CaCO_3$) | 61.4 |
| | Quartz ($SiO_2$) | 38.1 |

TABLE C2

Elemental composition of tested samples in % from X-Ray Fluorescence (XRF) analysis.

| Element | Sample 1 | Sample 2 | Sample 3 | Sample 4 | Sample 5 |
|---|---|---|---|---|---|
| $Na_2O$ (%) | 3.84 | 2.1 | 3.35 | 2.13 | 5.4 |
| MgO (%) | 0.779 | 0.599 | 0.512 | 0.518 | 0.211 |
| $Al_2O_3$ (%) | 0.636 | 0.848 | 0.59 | 0.471 | 0.004 |
| $SiO_2$ (%) | 1.612 | 3.165 | 1.003 | 0.474 | 4.787 |
| S (%) | 45.7 | 11.6 | 41.1 | 43.6 | 4.4 |
| $K_2O$ (%) | 0.01 | 0.13 | 0 | 0 | 0 |
| CaO (%) | 2.691 | 14.72 | 1.573 | 0.03 | 49.31 |
| $TiO_2$ (%) | 0 | 0.045 | 0.018 | 0.015 | 0.04 |
| MnO (%) | 0.312 | 0.588 | 0.587 | 0.85 | 0.131 |
| $Fe_2O_3$ (%) | 70.92 | 61.85 | 80.43 | 80.54 | 20.51 |
| Na (%) | 2.85 | 1.5 | 2.49 | 1.58 | 4 |
| Mg (%) | 0.47 | 0.361 | 0.309 | 0.313 | 0.127 |
| Al (%) | 0.337 | 0.449 | 0.312 | 0.249 | 0.002 |
| Si (%) | 0.754 | 1.479 | 0.469 | 0.222 | 2.238 |
| K (%) | 0.009 | 0.11 | 0 | 0 | 0 |
| Ca (%) | 1.923 | 10.52 | 1.124 | 0.021 | 35.24 |
| Ti (%) | 0 | 0.027 | 0.011 | 0.009 | 0.024 |
| Mn (%) | 0.241 | 0.455 | 0.455 | 0.658 | 0.102 |
| Fe (%) | 49.6 | 43.26 | 56.25 | 56.33 | 14.35 |

Figure 8:
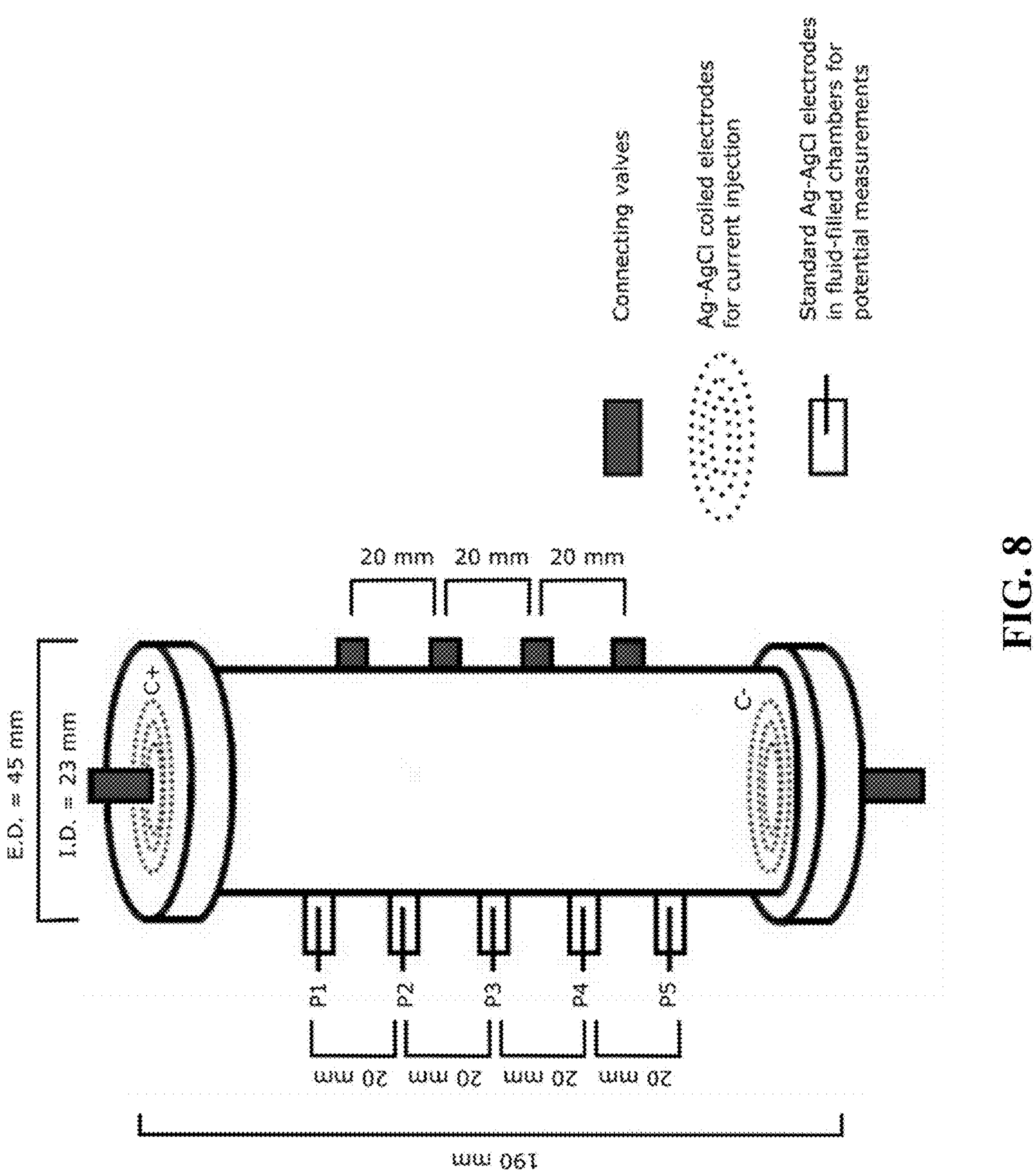
FIG. 8 illustrates an embodiment of a column.

All columns were dry-packed and saturated with a standard solution of potassium chloride (KCl) of 280 μS/cm conductivity from the bottom to the top of the column until full saturation was achieved and its pore-space entirely filled with the KCl. After saturation, the column was sealed, and the experiment was performed under no flow (static conditions). The columns were outfitted with Ag—AgCl potential electrodes (P1-P5 of FIG. 8) outside the current pathway but in electrolytic contact with the column to reduce any unwanted electrode polarization effects. All chambers depicted in FIG. 8 were identical. Different set-ups can be constructed and adjusted depending on the needs of each experiment (e.g., size, number of electrodes). Moreover, the valves at the bottom and on the top of the chamber were designed to control the inflow, and the outflow of the fluids. The Ag—AgCl electrodes can have some advantages in comparison with pure metal electrodes. They are more stable and make almost non-polarizable, low-impedance contact between the sample and measurement apparatus.

Geophysical monitoring involved spectral-induced polarization (SIP) measurements in the frequency range of 0.01-10,000 Hz, collecting seven measurements per logarithmic decade. The laboratory SIP instruments, PSIP by Ontash & Ermac (https://www.ontash.com/), which is optimized for laboratory SIP measurements was used. Measurements between electrodes P3-P4 (FIG. 8) were obtained in the depicted column. The duration of each SIP sweep was 39 minutes. Before each data acquisition run, the electrode contact resistance between all electrodes was measured to identify, and remedy, any contact resistance issues. The phase error of the experimental setup was <0.1 mrad, consistent with the SIP system characteristics and columns optimized for SIP measurements. All experiments were performed in duplicate and conducted in a controlled laboratory environment at a temperature of 23.5±1° C. Throughout the testing period, every sample was tested multiple times to assure repeatability, reliability and robustness of the results, and in all tests, results were uniformly showing consistency with previous trends.

The SIP technique measures the phase shift ($\varphi$) and conductivity magnitude ($|\sigma|$) of an injected alternating current, typically across a wide frequency range (base configuration 0.01 Hz-20 kHz) to estimate the real ($\sigma'$) and imaginary ($\sigma''$) component of complex conductivity ($\sigma^*$) or complex resistivity $$\left(p^* = \frac{1}{c^*}\right).$$

The resistance amplitude is deduced from the magnitude times the value of the selected shunt resistor. The PSIP offers the possibility to choose the most appropriate value (10 Ω, 100 Ω, 1000Ω, and 10000Ω) depending on the resistance of the sample. For SIP low-frequency complex conductivity ($\sigma^*$), equations 1, 2 and 3 show how its represented, and how its real ($\sigma'$) and imaginary ($\sigma''$) parts are calculated.

$$\sigma^* = \sigma' + i\sigma'' \quad (1)$$

$$\sigma' = |\sigma| \cos\varphi \quad (2)$$

$$\sigma'' = |\sigma| \sin\varphi \quad (3)$$

The real part ($\sigma'$) of the complex conductivity describes energy loss (in-phase conduction), while the imaginary one ($\sigma''$) describes polarization or out-of-phase energy storage.

Embodiments

An embodiment is provided of a first method for identifying an onset of a scale formation, the method comprising: applying an alternating current to a sample from a hydrocarbon containing formation: varying the frequency of the alternating current to the sample; measuring a phase shift and conductivity magnitude of the applied alternating current; and identifying an onset of a scale in the sample based on the phase shift and conductivity magnitude.

The first method of above embodiment, wherein the hydrocarbon containing formation comprises production tubing.

The first method of any of the above embodiments, wherein the hydrocarbon containing formation comprises reservoir rock formations.

The first method of any of the above embodiments, wherein the scale type comprises one or more iron sulfides.

The first method of any of the above embodiments, wherein the scale type comprises iron (II) disulfide.

The first method of any of the above embodiments, further comprising differentiating a portion of a signal resulting from the applied alternating current, wherein the portion of the signal results from the production tubing.

The first method of any of the above embodiments, wherein the frequency of the alternating current is varied within a frequency range of about 0.01 to about 10,000 Hz.

The first method of any of the above embodiments, further comprising determining a real component of a complex conductivity using the phase shift and conductivity magnitude.

The first method of the above embodiment, wherein the real component comprises energy loss.

The first method of any of the above embodiments, further comprising determining an imaginary component of a complex conductivity using the phase shift and conductivity magnitude.

The first method of the above embodiment, wherein the imaginary component comprises an out-of-phase energy storage.

An embodiment is provided of a second method for identifying scale type, the method comprising: applying an alternating current to a sample comprising scale from a hydrocarbon containing formation: varying the frequency of the alternating current to the sample: measuring a phase shift and conductivity magnitude of the applied alternating current; and identifying a scale type of the sample based on the phase shift and conductivity magnitude.

The second method of above embodiment, further comprising determining the amount of a scale formation in the hydrocarbon containing formation.

The second method of any of the above embodiments, wherein the hydrocarbon containing formation comprises production tubing.

The second method of any of the above embodiments, wherein the hydrocarbon containing formation comprises reservoir rock formations.

The second method of any of the above embodiments, further comprising differentiating a portion of a signal resulting from the applied alternating current, wherein the portion of the signal results from the production tubing.

The second method of any of the above embodiments, wherein the scale type comprises one or more iron sulfides.

The second method of any of the above embodiments, wherein the scale type comprises iron (II) disulfide The second method of any of the above embodiments, wherein the frequency of the alternating current is varied within a frequency range of about 0.01 to about 10,000 Hz.

The second method of any of the above embodiments, further comprising determining a real component of a complex conductivity using the phase shift and conductivity magnitude.

The second method of above embodiment, wherein the real component comprises energy loss.

The second method of any of the above embodiments, further comprising determining an imaginary component of a complex conductivity using the phase shift and conductivity magnitude.

The second method of above embodiment, wherein the imaginary component comprises an out-of-phase energy storage.

The second method of any of the above embodiments, further comprising identifying at least one grain property of the scale.

The second method of above embodiment, wherein the grain property comprises at least one of the following: size, geometry, distribution, and roughness.

The second method of any of the above embodiments, further comprising identifying a structure of the scale.

The second method of any of the above embodiments, further comprising identifying a composition of the scale.

An embodiment is provided of a system for identifying scale type, the system comprising: an electrode configured to apply an alternating current to a sample comprising scale from a hydrocarbon containing formation: a control configured to vary the frequency of the alternating current to the sample; and a potential electrode for measuring a phase shift and conductivity magnitude of the applied alternating current for identifying a scale type from the sample.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for identifying an onset of a scale formation, the method comprising:

applying an alternating current to a sample from a hydrocarbon containing formation;

varying the frequency of the alternating current to the sample;

measuring a phase shift and conductivity magnitude of the applied alternating current;

identifying an onset of a scale in the sample based on the phase shift and conductivity magnitude;

differentiating a portion of a signal resulting from the applied alternating current, wherein the portion of the signal results from production tubing; and determining a real component of a complex conductivity using the phase shift and conductivity magnitude, wherein the real component comprises energy loss; and/or determining an imaginary component of a complex conductivity using the phase shift and conductivity magnitude, wherein the imaginary component comprises an out-of-phase energy storage.

2. The method of claim 1, wherein the hydrocarbon containing formation comprises production tubing.

3. The method of claim 1, wherein the hydrocarbon containing formation comprises reservoir rock formations.

4. The method of claim 1, wherein the scale type comprises one or more iron sulfides.

5. The method of claim 1, wherein the scale type comprises iron (II) disulfide.

6. The method of claim 1, wherein the frequency of the alternating current is varied within a frequency range of about 0.01 to about 10,000 Hz.

7. A method for identifying scale type, the method comprising: applying an alternating current to a sample comprising scale from a hydrocarbon containing formation;

varying the frequency of the alternating current to the sample;

measuring a phase shift and conductivity magnitude of the applied alternating current;

identifying a scale type of the sample based on the phase shift and conductivity magnitude;

identifying a structure of the scale based on the phase shift and conductivity magnitude; and determining a real component of a complex conductivity using the phase shift and conductivity magnitude, wherein the real component comprises energy loss; and/or determining an imaginary component of a complex conductivity using the phase shift and conductivity magnitude, wherein the imaginary component comprises an out-of-phase energy storage.

8. The method of claim 7, further comprising determining the amount of a scale formation in the hydrocarbon containing formation.

9. The method of claim 7, wherein the hydrocarbon containing formation comprises production tubing.

10. The method of claim 7, wherein the hydrocarbon containing formation comprises reservoir rock formations.

11. The method of claim 7, further comprising differentiating a portion of a signal resulting from the applied alternating current, wherein the portion of the signal results from production tubing.

12. The method of claim 7, wherein the scale type comprises one or more iron sulfides.

13. The method of claim 7, wherein the scale type comprises iron (II) disulfide.

14. The method of claim 7, wherein the frequency of the alternating current is varied within a frequency range of about 0.01 to about 10,000 Hz.

15. The method of claim 7, further comprising identifying at least one grain property of the scale.

16. The method of claim 15, wherein the grain property comprises at least one of the following: size, geometry, distribution, and roughness.

17. The method of claim 7, further comprising identifying a composition of the scale based on the phase shift and conductivity magnitude.

* * * * *